(12) United States Patent
Kirazci et al.

(10) Patent No.: US 10,067,674 B2
(45) Date of Patent: Sep. 4, 2018

(54) CONSISTENT, DISK-BACKED ARRAYS

(71) Applicant: Google LLC, Mountain View, CA (US)

(72) Inventors: Ulas Kirazci, Mountain View, CA (US); Scott Banachowski, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/233,021

(22) Filed: Aug. 10, 2016

(65) Prior Publication Data

US 2016/0350001 A1 Dec. 1, 2016

Related U.S. Application Data

(62) Division of application No. 13/970,075, filed on Aug. 19, 2013, now Pat. No. 9,424,125.

(60) Provisional application No. 61/753,159, filed on Jan. 16, 2013.

(51) Int. Cl.
| | | |
|---|---|---|
| G06F 12/00 | (2006.01) |
| G06F 13/00 | (2006.01) |
| G06F 13/28 | (2006.01) |
| G06F 3/06 | (2006.01) |
| G06F 11/10 | (2006.01) |
| G06F 17/30 | (2006.01) |

(52) U.S. Cl.
CPC .......... *G06F 3/0604* (2013.01); *G06F 3/0644* (2013.01); *G06F 3/0647* (2013.01); *G06F 3/0673* (2013.01); *G06F 11/1004* (2013.01); *G06F 17/30324* (2013.01)

(58) Field of Classification Search
CPC .......... G06F 11/1004; G06F 17/30324; G06F 3/0604; G06F 3/0644; G06F 3/0647; G06F 3/0673
USPC ........................................................ 711/103
See application file for complete search history.

(56) References Cited

U.S. PATENT DOCUMENTS

| | | | | |
|---|---|---|---|---|
| 4,746,233 | A * | 5/1988 | Garcia de Osuna | B41J 3/50 101/287 |
| 5,414,839 | A * | 5/1995 | Joshi | G06F 9/524 |
| 5,509,120 | A * | 4/1996 | Merkin | G06F 21/575 713/188 |
| 5,574,874 | A * | 11/1996 | Jones | G06F 11/1407 711/100 |
| 5,652,793 | A * | 7/1997 | Priem | G06F 21/10 340/5.74 |
| 5,870,520 | A * | 2/1999 | Lee | G11C 29/765 714/6.12 |
| 6,549,977 | B1 * | 4/2003 | Horst | G06F 3/061 711/113 |
| 6,553,388 | B1 * | 4/2003 | Perks | G06F 17/30368 |
| 6,775,794 | B1 * | 8/2004 | Horst | G06F 11/1092 711/114 |
| 6,981,114 | B1 | 12/2005 | Wu et al. | |

(Continued)

FOREIGN PATENT DOCUMENTS

| | | |
|---|---|---|
| WO | 2000/060463 | 10/2000 |
| WO | 2005/072179 | 8/2005 |
| WO | 2008/157735 | 12/2008 |

*Primary Examiner* — Sheng-Jen Tsai
(74) *Attorney, Agent, or Firm* — Fish & Richardson P.C.

(57) ABSTRACT

Disk-backed array techniques can, in some implementations, help ensure that the arrays contain consistent data. An alert can be provided if it is determined that the data in the array is, or may be, corrupted.

18 Claims, 4 Drawing Sheets

(56) References Cited

U.S. PATENT DOCUMENTS

| | | | |
|---|---|---|---|
| 7,082,446 B1* | 7/2006 | Bottomley | G06F 17/30578 707/610 |
| 7,480,907 B1* | 1/2009 | Marolia | G06F 8/65 717/127 |
| 7,539,828 B2 | 5/2009 | Lomnes | |
| 7,908,448 B1* | 3/2011 | Chatterjee | G06F 11/2064 707/655 |
| 7,917,717 B2 | 3/2011 | Lomnes | |
| 7,971,199 B1 | 6/2011 | Chen | |
| 7,979,396 B1* | 7/2011 | Krishnamurthy | G06F 17/30575 707/655 |
| 8,046,548 B1* | 10/2011 | Chatterjee | G06F 11/2064 707/655 |
| 8,065,472 B2* | 11/2011 | Manus | G06F 12/0804 711/103 |
| 8,291,180 B2* | 10/2012 | Austruy | G06F 11/1662 711/162 |
| 8,335,771 B1* | 12/2012 | Natanzon | G06F 17/30008 707/684 |
| 8,549,230 B1 | 10/2013 | Mukherjee et al. | |
| 8,572,337 B1* | 10/2013 | Gokhale | G06F 11/1466 707/639 |
| 9,424,125 B2* | 8/2016 | Kirazci | G06F 11/1004 |
| 2002/0023225 A1 | 2/2002 | Lomnes | |
| 2003/0159056 A1* | 8/2003 | Cromer | G06F 21/70 713/193 |
| 2004/0100966 A1* | 5/2004 | Allen, Jr. | H04L 1/0061 370/395.1 |
| 2004/0123282 A1* | 6/2004 | Rao | G06F 8/665 717/168 |
| 2004/0153952 A1* | 8/2004 | Sharma | H04L 1/0061 714/781 |
| 2004/0179228 A1 | 9/2004 | McCluskey | |
| 2004/0221125 A1* | 11/2004 | Ananthanarayanan | G06F 3/0613 711/203 |
| 2005/0091569 A1* | 4/2005 | Chao | G06F 11/1004 714/758 |
| 2005/0132179 A1* | 6/2005 | Glaum | G06F 11/1433 713/1 |
| 2005/0138347 A1* | 6/2005 | Haverkamp | G06F 8/65 713/2 |
| 2005/0149818 A1* | 7/2005 | Tsai | H03M 13/091 714/758 |
| 2005/0198432 A1* | 9/2005 | Lo | G06F 1/30 711/112 |
| 2006/0072369 A1* | 4/2006 | Madter | G06F 12/0804 365/232 |
| 2006/0179367 A1* | 8/2006 | Cho | G06F 8/65 714/710 |
| 2006/0265568 A1* | 11/2006 | Burton | G06F 12/0862 711/216 |
| 2007/0032228 A1* | 2/2007 | Varanda | G06F 9/4418 455/418 |
| 2007/0088912 A1* | 4/2007 | Mukherjee | G06F 3/061 711/112 |
| 2007/0288533 A1* | 12/2007 | Srivastava | G06F 17/30215 |
| 2008/0046608 A1* | 2/2008 | Lee | G06F 13/4045 710/30 |
| 2008/0071963 A1 | 3/2008 | Chow et al. | |
| 2008/0091876 A1* | 4/2008 | Fujibayashi | G06F 1/3221 711/113 |
| 2008/0096671 A1* | 4/2008 | Gagner | G06F 11/1441 463/43 |
| 2008/0117685 A1* | 5/2008 | Syzdek | G11C 16/28 365/185.21 |
| 2008/0195912 A1* | 8/2008 | Mende | H03M 13/09 714/752 |
| 2009/0019342 A1* | 1/2009 | Gueron | H03M 13/091 714/781 |
| 2009/0031097 A1* | 1/2009 | Nelson | G06F 11/1435 711/162 |
| 2009/0106580 A1* | 4/2009 | Slyz | G06F 11/1433 714/5.1 |
| 2009/0119450 A1* | 5/2009 | Saeki | G06F 12/0246 711/103 |
| 2009/0248964 A1* | 10/2009 | Yano | G06F 12/0246 711/103 |
| 2009/0254725 A1 | 10/2009 | Lomnes | |
| 2010/0011279 A1* | 1/2010 | Becker | H03M 13/3738 714/807 |
| 2010/0220536 A1* | 9/2010 | Coteus | G06F 13/1689 365/193 |
| 2010/0287351 A1* | 11/2010 | Kren | G06F 9/526 711/165 |
| 2011/0138142 A1 | 6/2011 | Lomnes | |
| 2011/0200146 A1* | 8/2011 | Ikeda | H04L 1/0045 375/316 |
| 2011/0280381 A1* | 11/2011 | Okamoto | G01V 1/008 379/37 |
| 2011/0283070 A1* | 11/2011 | Rischar | G05B 19/042 711/162 |
| 2012/0254636 A1* | 10/2012 | Tsukamoto | G06F 1/30 713/300 |
| 2012/0278799 A1* | 11/2012 | Starks | G06F 9/455 718/1 |
| 2013/0103650 A1 | 4/2013 | Natanzon et al. | |
| 2013/0117641 A1* | 5/2013 | Bains | G06F 11/1016 714/802 |
| 2013/0128022 A1* | 5/2013 | Bose | H04N 7/18 348/77 |
| 2013/0268717 A1* | 10/2013 | Scouller | G06F 12/0246 711/103 |
| 2014/0181397 A1* | 6/2014 | Bonzini | G06F 12/16 711/112 |

\* cited by examiner

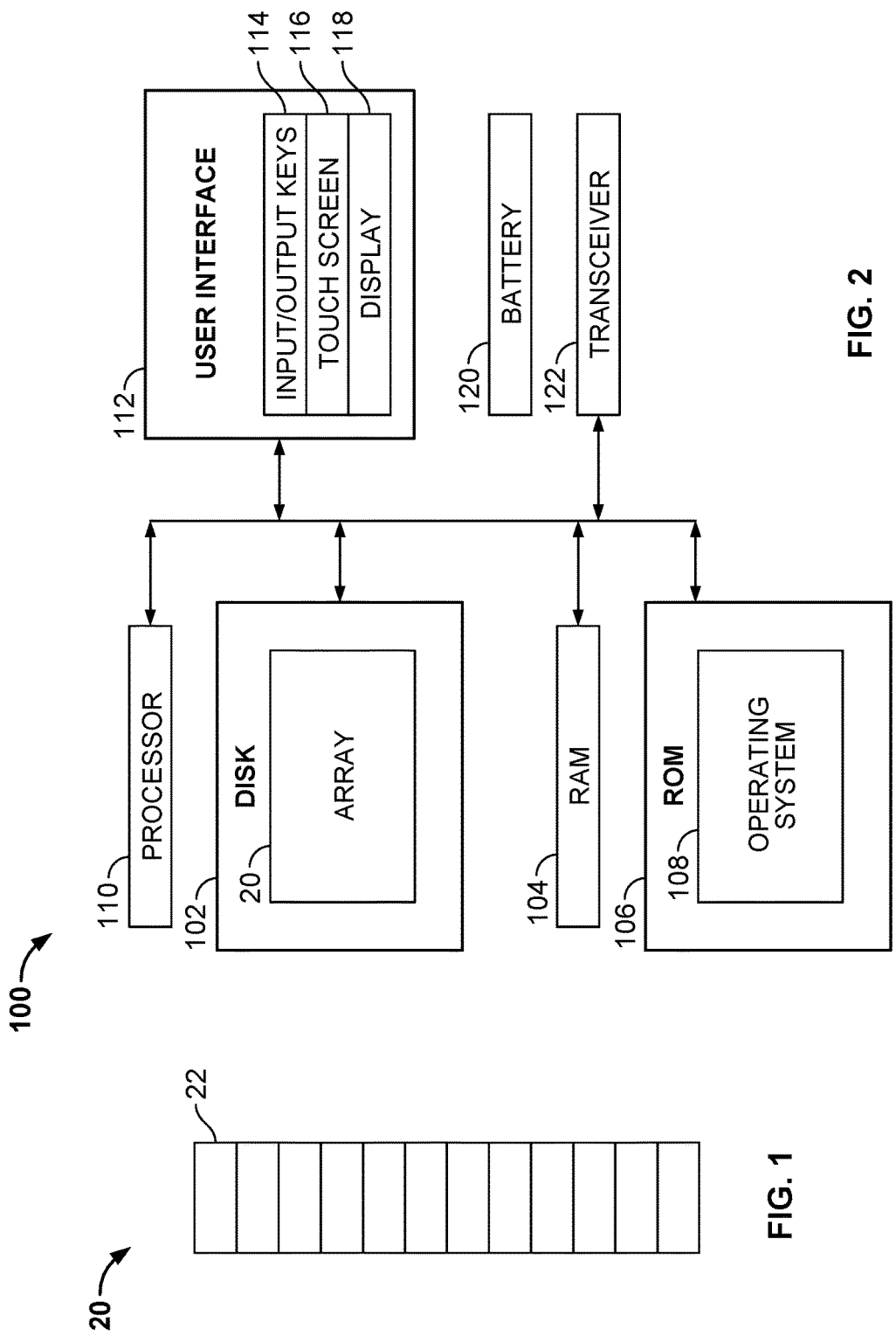

CONSISTENT, DISK-BACKED ARRAYS

CROSS-REFERENCE TO RELATED APPLICATION(S)

This application is a divisional of U.S. patent application Ser. No. 13/970,075, filed on Aug. 19, 2013, which claims the benefit of U.S. Provisional Application No. 61/753,159, filed on Jan. 16, 2013, the entire contents of which is incorporated by reference.

FIELD OF THE DISCLOSURE

The present disclosure relates to consistent disk-backed arrays.

BACKGROUND

An array is a data structure consisting of a collection of elements (values or variables), each of which is identified by at least one array index or key. Arrays are sometimes used to implement tables, such as look-up tables. Many software programs use arrays, which also can be used to implement other data structures, such as lists, strings and tries.

In general, it is desirable for an array to be persistent such that the data in the array remains valid even if power is removed from the device storing the array. For this reason, arrays often are stored on disk (e.g., flash memory). However, some arrays are mutable, such that the data structure can be updated, for example, to include additional elements. In such situations, the data in the array between transactions (e.g., between updates) may contain inconsistent states and, therefore, may contain errors.

SUMMARY

The present disclosure describes disk-backed array techniques that can, in some implementations, help ensure that the arrays contain consistent data. An alert can be provided if it is determined that the data in the array is, or may be, corrupted.

For example, one aspect describes a method of managing changes to an array in non-volatile storage of a computing device. The method includes storing, in random access or other volatile memory of the computing device, information indicative of changes to be made to the array. A pre-specified bit in the non-volatile storage that is associated with the array is set, for example, in response to a user request (e.g., after a batch of changes are made to the array). A request is received in the computing device to carry over to the non-volatile storage the changes indicated by the information stored in the random access or other volatile memory, and a request is received in the computing device to clear the pre-specified bit.

In some implementations, the method includes subsequently checking whether the pre-specified bit has been cleared, and determining, based on results of the checking, whether data in the array in the non-volatile storage is, or may be, corrupted. In some implementations, checking whether the pre-specified bit has been cleared and determining whether data in the array in the non-volatile storage is corrupted is performed after power is restored to the computing device following a power loss. In the event that it is determined that the data is or may be corrupted, an alert can be provided. For example, in some cases, providing an alert includes providing a message in the computing device indicating the presence of possibly corrupted data in the array in the non-volatile storage.

According to another aspect, a method of managing changes to an array in non-volatile storage includes storing, in volatile memory, a mapping of the array that is in non-volatile storage. Requested modifications are made to one or more sections of the array as stored in the volatile memory. Original, unmodified values of the array corresponding to the modified sections may be stored in the volatile memory as well. The method also includes computing a cyclic redundancy check (CRC) value for the entire array as modified, and writing the one or more modified sections of the array and the CRC value to the non-volatile storage.

Some implementations can include subsequently computing a new CRC value for the entire array as stored in the non-volatile storage and comparing the new CRC value to the CRC value previously written to the non-volatile storage. A determination can be made as to whether data in the array in the non-volatile storage is corrupted based on the comparison.

Various techniques can be used to compute a CRC value for the modified array stored in non-volatile memory. For example, the CRC value can be updated incrementally, rather than computing a new CRC for the entire modified array each time. Updating the CRC value incrementally can be based, at least in part, on using the original, unmodified values of the array stored in the volatile memory. In some implementations, the original, unmodified values of the array are maintained in the volatile memory only up to a predetermined constant fraction of the array size, and the CRC value is updated incrementally only if a changed area of the array is less than the predetermined constant fraction of the array size.

The disclosure also describes computing devices, such as mobile phones and the like, that store a mutable array in non-volatile memory and which can be managed using the foregoing techniques.

Performing various processing tasks on data stored in the volatile memory can increase overall processing speed for updating and incorporating changes to the array(s), while also reducing the likelihood of inconsistent data being present in the array(s) in the non-volatile storage.

A particular example of an application for the disclosed techniques is in connection with a mutable trie structure that is composed of multiple arrays. The trie can be used, for example, for searching files locally on a mobile phone or other computing device. The disclosed techniques can help ensure that as the arrays in the trie structure are updated, the data stored in non-volatile memory remains consistent. If the data becomes (or appears to be) corrupted, an alert can be provided. The techniques also can be used in other applications.

Other aspects, features and advantages will be apparent from the following detailed description, the accompanying drawings and the claims.

BRIEF DESCRIPTION OF THE DRAWINGS

FIG. 1 illustrates an example of an array.

FIG. 2 is a block diagram of an example of a computing device that stores the array.

DETAILED DESCRIPTION

Figure 3:
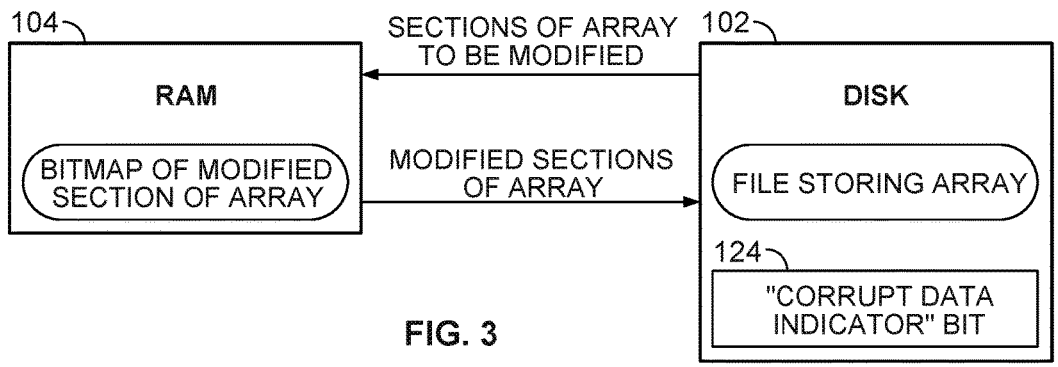
FIG. 3 illustrates a first implementation of how changes to an array are managed.

The techniques described here can be used in connection with various arrays. For the purposes of illustration, FIG. 1 shows an example of an array 20. Array 20 can be stored, for example, in a non-volatile, or persistent, storage medium 102, such as disk or flash memory, on a mobile phone or other computing device 100 (see FIG. 2). The non-volatile storage medium 102 retains data and information stored thereon even if power is removed from the device. Power loss may be intentional (e.g., a device reboot or shutdown) or accidental (e.g., a power failure). The computing device 100 also may include other components such as volatile memory (e.g., random access memory (RAM)) 104, read-only memory (ROM) 106 that stores the device's operating system 108 and other software instructions, a processor 110, a user interface 112 (including, e.g., input/output keys 114, a touch screen 116, and a display 118), a battery or other power source 120 and a transceiver 122.

As illustrated in FIG. 1, array 20 contains multiple elements 22. In some implementations, array 20 can be part of a data structure that can be searched. Array 20 can be used, for example, in connection with a key value look-up table on a computing device. In some implementations, array 20 can be updated dynamically to incorporate new elements 22 or to change the contents of existing elements.

Figure 4:
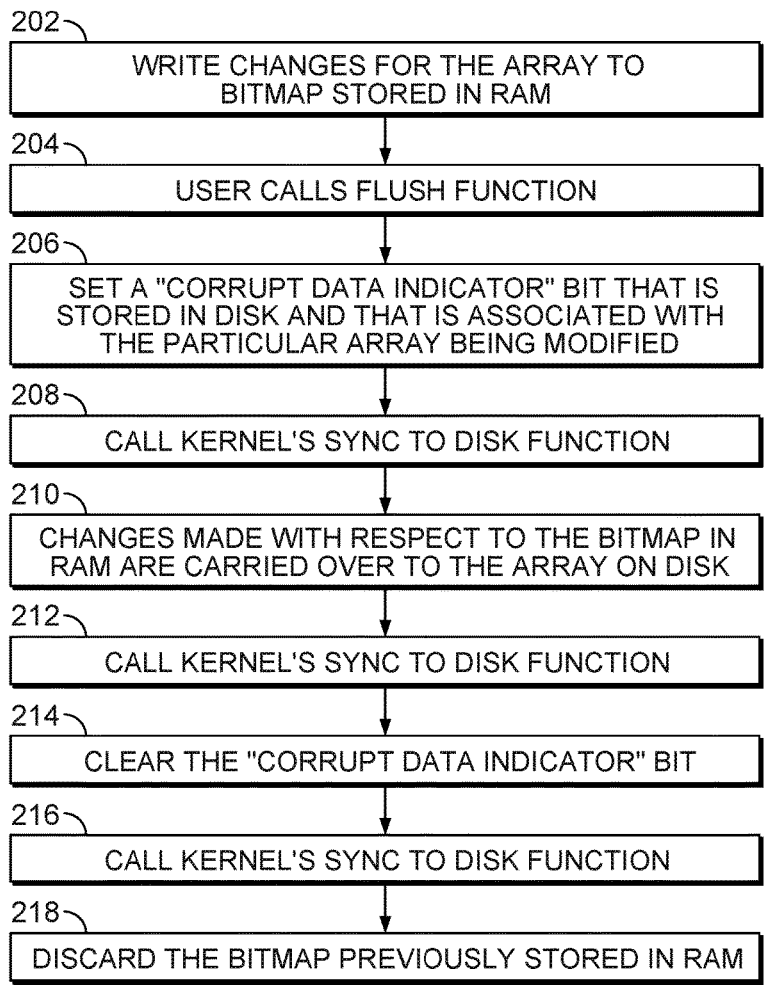
FIG. 4 is a flow chart illustrating a first method of managing changes to the array.

This and the following paragraphs describe a first technique for storing changes to array 20. In this first technique, the device operates according to a private mode, in which the kernel (i.e., the operating system) obtains a bitmap of the portions(s) of the underlying file of array 20 that is being modified (see FIG. 3). The bitmap is stored in RAM 104, and when an attempt is made to write to the array 20, changes are made to the bitmap in RAM 104, rather than to the array stored in disk 102 (FIG. 4, block 202). In some implementations, 4-kbyte sections of the array 20 are stored in RAM 104 corresponding to the section(s) of the array being modified.

After modifications to array 20 are made and stored by the bitmap in RAM 104, a user can call a Flush function with respect to the array (block 204). Calling the Flush function causes the processor 110 to set a special bit 124 that is stored in disk 102 and that is associated with the particular array 20 being modified (block 206). The special bit 124 may be referred to as a "corrupt data indicator" bit, for reasons that will become evident below, and can be located, for example, at the end of the disk space. Next, the kernel's Sync to Disk function is called (block 208). Changes that were made with respect to the bitmap in RAM 104 then are carried over to array 20 that is stored on disk 102 (see FIG. 3, and block 210 of FIG. 4), and the kernel's Sync to Disk function is called again (block 212). In particular, the Sync to Disk function writes any data buffered in memory 104 to disk 102 and synchronizes disk 102. The kernel can receive confirmation when the Sync to Disk function is returned. Once the changes to the array are written to the file stored in disk 102, the kernel clears the "corrupt data indicator" bit 124 and synchronizes disk 102 (block 214), and the kernel's Sync to Disk function is called again (block 216). In addition, the kernel discards the bitmap previously stored in RAM 104 (block 218). A new bitmap then can be initiated in RAM 104 so as to track any additional changes to the array.

By using the foregoing technique, in the event that the program executed by processor 110 is interrupted, for example, as the result of a power loss to the device 100 or a crash (i.e., a condition where a processor or a program, either an application or part of the operating system, ceases to function properly), the data stored in the array 20 on disk 102 can be considered valid up until the last time the Flush function was called. In other words, since changes to the array 20 initially are made only in RAM 104, data stored in the array can be considered valid up until the last time the Flush function was called.

An exception can occur if the program is interrupted during execution of the Flush function. In such a situation, it is possible that data stored in the array 20 on disk 102 may be corrupted and is not necessarily valid. Nevertheless, the status of the "corrupt data indicator" bit 124 can be used to determine whether the changes to the array were successfully carried over to disk 102. In particular, if the "corrupt data indicator" bit 124 associated with the file for the particular array is still set when power is restored to device 100, the bit 124 would thus indicate that the file may be corrupted. In some implementations, a message can be provided automatically as an alert regarding the presence of possibly corrupted data in the particular file on disk 102. On the other hand, if the "corrupt data indicator" bit 124 is clear when power is restored to the device, the bit's status would indicate that the data was successfully written to the array on disk 102. One advantage to the foregoing technique for storing a mutable array is that, other than during the Flush sequence, the data in the array is more reliably secure.

Whereas the foregoing first technique employs explicit disk synchronization, the second technique, described in this and the following paragraphs uses check pointing, without disk synchronization. The file storing the array 20 that is being modified is stored in a shared mode, in which it is assumed that changes made in RAM 104 will be reflected in the file on disk 101. However, the timing of carrying over the changes to disk 102 is handled by the operating system 108 at a time of its own choosing and can be optimized, for example, in accordance with other system operations.

Figure 5:
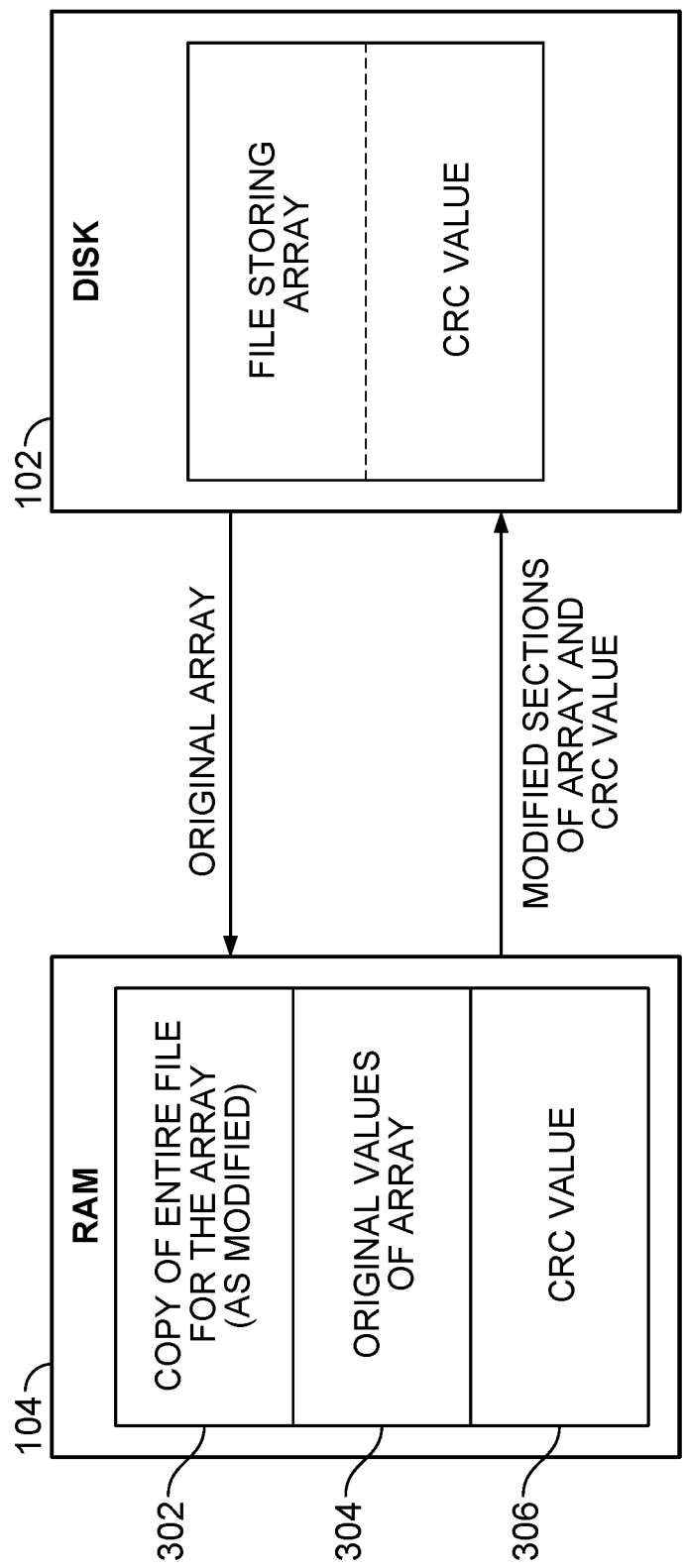
FIG. 5 illustrates a second implementation of how changes to an array are managed.
Figure 6:
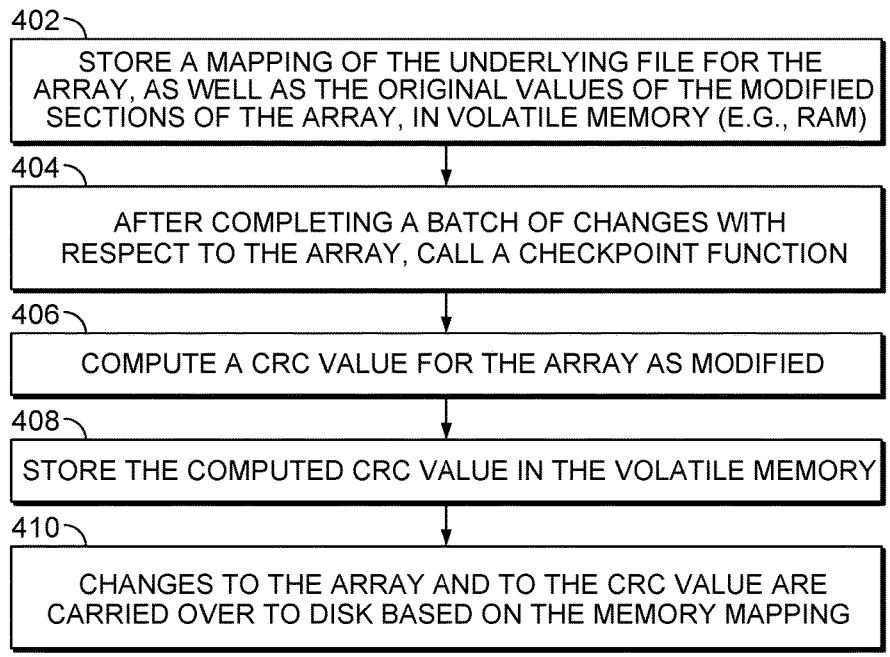
FIG. 6 is a flow chart illustrating a second method of managing changes to the array.

In the shared mode, when a section of array 20 is modified, the changes are reflected immediately in the kernel buffers in RAM 104. In particular, as shown in FIG. 5, the kernel can store in RAM 104 a mapping 302 of the underlying file for the array (including any changes that are made to the array), and also can store the original values 304 of the modified sections of the array (i.e., prior to the modifications) (see also FIG. 6, block 402). Preferably, the original values of the array are maintained in RAM 104 only up to a predetermined constant fraction "k" (e.g., 20%) of the array size. When a batch of changes is completed with respect to the array, the user can call a Checkpoint function (block 404). The Checkpoint function computes a cyclic redundancy check (CRC) value for the array as modified (block 406), and stores the computed CRC value 306 is stored in RAM 104 (block 408). The CRC value can be computed as discussed in greater detail below, which also describes an advantage of maintaining the original values of the array in RAM 104. Changes to array 20 and to the CRC value are carried over to disk 102 based on the memory mapping (block 410). As mentioned above, operating system 108 can carry over the information to disk 20 at a time selected, for example, to optimize overall system performance. The CRC value can be written and stored, for example, in four bytes at the end of the array file on disk 102.

Figure 7:
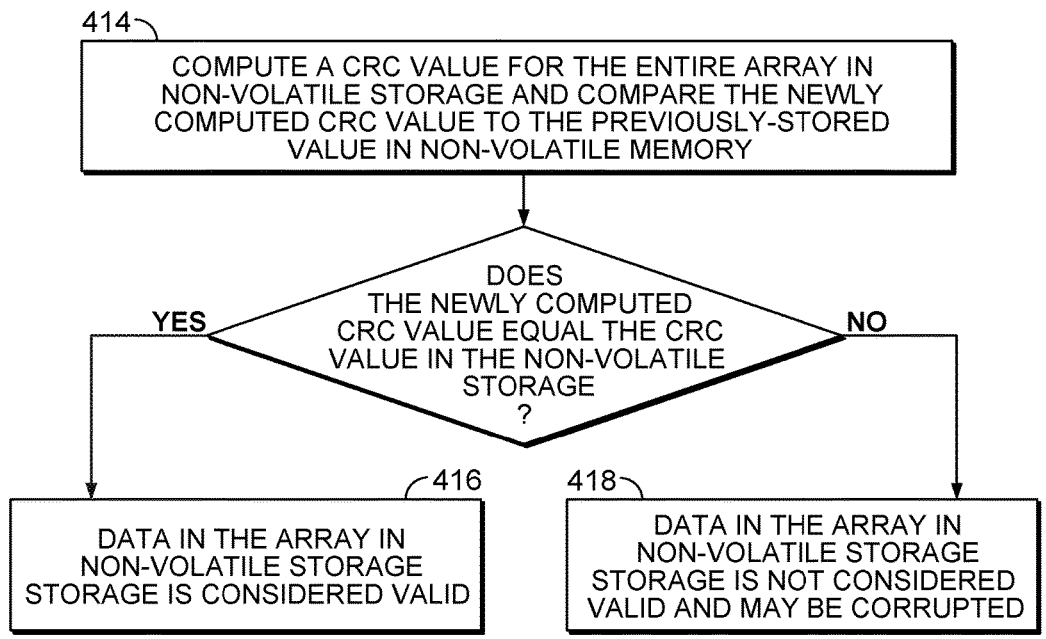
FIG. 7 is a flow chart illustrating a method of reading data from the array.

As illustrated in FIG. 7, when the program executed by processor 110 returns and reads data from the array 20 on disk 102, the program computes a CRC value for the entire array as stored on the disk, and compares the newly computed CRC value to the CRC value previously-stored in disk 102 (bock 414). If the newly computed value equals the CRC value stored in the file on disk 102, then the data stored in the array on disk 102 is valid (block 416). On the other hand, if the newly computed value does not equal the CRC value stored in the file on disk 102, then the data stored in the array on disk 102 is not valid and may be corrupted (block 418). In some implementations, a message can be provided automatically as an alert regarding the presence of possibly corrupted data in the particular file on disk 102. One advantage to the foregoing technique for storing a mutable array is that fewer disk sync operations need to be performed.

One approach to calculating the CRC value for the array data stored in RAM 104 (in block 404 of FIG. 6) is to recalculate the CRC value for the entire array each time the Checkpoint function is called. Although such an approach can be used, it can be very time consuming. For example, if array 20 has size N and the Checkpoint function is called N/K times in fixed chunks of size K, then the total number of operations required to execute the CRCs is on the order of $N^2$.

An alternative approach makes use of the original values 304 of the array stored in RAM 104 and allows the CRC value to be updated incrementally, rather than re-computing a new CRC value for the entire array every time. The following technique can be used to replace a part of information M(x) in-place, and to re-compute the CRC value of modified information M(x) efficiently. If information M=ABC is a concatenation of parts A, B, and C, and B'(x) is a new part of the same length as B(x), $CRC_u(M')$ of information M'=AB'C may be computed from known $CRC_u(M)$. In particular:

$$CRC_u(M'(x),v(x)) = CRC_u(M(x),v(x)) + \Delta$$

where $$\Delta = \{CRC_u(B'(x),v(x)) - (CRC_u(B(x),v(x)))\} x^{|C|} \bmod |P(x).$$

In some implementations, the CRC value is computed (in block 404) using the foregoing incremental updating technique if the changed area of the array is less than the predetermined constant fraction of the array size "k" (e.g., 20%). An advantage to this approach is that it can be less time consuming because the number of operations required is on the order of $[n*\log(n)]$, rather than $n^2$. In the event that the changed area of the array is equal to or greater than the predetermined constant fraction of the array size "k" (e.g., 20%), then the program simply re-computes the CRC for the entire array.

In some scenarios, array 20 may be modified by appending new data to the array rather than changing existing elements in the array. In such a case, there is no original CRC value with respect to the newly appended data. Nevertheless, an updated CRC value for the array as modified can be computed by obtaining a CRC value for the newly added elements in the array, and then adding this CRC value to the CRC value previously obtained for the array prior to its modification.

For example, if information $M(x)=M_1(x) \cdot xM^{|2|}+M_2(x)$ is a concatenation of $M_1$ and $M_2$, and CRCs of $M_1$, $M_2$ (computed with some initial values $v_1(x)$, $v_2(x)$ respectively) are known, then $CRC_u(M(x); v(x))$ can be computed without touching contents of the M. For example, the value of $v'_1=CRC_u(M_1; v)$ can be computed from the known $CRC_u(M_1; v_1)$ without touching the contents of $M_1$ using the following formula:

$$CRC_u(M;v') = CRC_u(M;v) + |\{(v'-v)x^{|M|}\} \bmod P.$$

Then, $v'2=CRC_u(M_2; v'_1)$ can be computed from known $CRCu(M_2; v_2)$ without touching the contents of M2. Finally, $CRC_u(M; v)=v'_2$. When using the foregoing technique to compute the CRC value, a pointer can be used to point to the last byte in the array touched by the user.

As indicated above, the foregoing techniques can be implemented, for example, on various types of handheld computing devices, such as mobile phones, tablets, personal digital assistants (PDAs), as well as desk top personal computers, laptop computers, and other computing devices.

Various aspects of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone or other computing device. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the invention. Accordingly, other implementations are within the scope of the claims.

What is claimed is:

1. A method of managing changes to an array in non-volatile storage, the method comprising:
    storing, in volatile memory of a computing device, the array that is stored in the non-volatile storage;
    storing, in the volatile memory of the computing device, information indicative of changes to be made to a portion of the array;
    computing a first cyclic redundancy check (CRC) value for the array before the changes are made to the portion of the array;
    computing a second CRC value for the portion of the array before the changes are made to the portion of the array;
    in response to storing, in the volatile memory of the computing device, the information indicative of the changes to be made to the portion of the array:
        computing a third CRC value for the portion of the array with the changes having been made to the portion of the array; and
        computing a fourth CRC value for the array with the changes having been made to the portion of the array, based on:
            (i) the first CRC value for the array before the changes are made to the portion of the array,
            (ii) the second CRC value for the portion of the array before the changes are made to the portion of the array, and
            (iii) the third CRC value for the portion of the array with the changes having been made to the portion of the array,
    carrying over to the portion of the array in the non-volatile storage the changes indicated by the information stored in the volatile memory;
    storing, in the non-volatile storage, the fourth CRC value that was generated based on the first CRC value, the second CRC value, and the third CRC value;
    detecting, by the computing device, a power interruption;
    in response to detecting the power interruption:
        computing a fifth CRC value based on the portion of the array in the non-volatile storage; and
        comparing the fourth CRC value that was generated based on the first CRC value, the second CRC value, and the third CRC value to the fifth CRC value; and
    based on determining the fourth CRC value matches the fifth CRC value, determining that the array in the non-volatile storage is valid.

2. The method of claim 1 including repeatedly calling a function to write data buffered in the volatile memory to the non-volatile storage so as to synchronize the non-volatile storage with the volatile memory.

3. The method of claim 1 wherein computing the fourth CRC value and storing the fourth CRC value in the non-volatile storage is performed in response to a user request.

4. The method of claim 1 wherein storing information indicative of changes to be made to the portion of the array in volatile memory includes making changes to a bitmap in the volatile memory, but not changing the array in non-volatile storage.

5. The method of claim 4 wherein the bitmap represents portions of an underlying file of the array in the non-volatile storage that are to be modified.

6. A method of managing changes to an array in non-volatile storage of a computing device, the method comprising:
    storing, in random access memory of the computing device, the array that is stored in the non-volatile storage;
    storing, in the random access memory of the computing device, information indicative of changes to be made to a portion of the array;
    computing a first cyclic redundancy check (CRC) value for the array before the changes are made to the portion of the array;
    computing a second CRC value for the portion of the array before the changes are made to the portion of the array;

in response to storing, in the random access memory of the computing device, the information indicative of the changes to be made to the portion of the array:
  computing a third CRC value for the portion of the array with the changes having been made to the portion of the array; and
  computing a fourth CRC value for the array with the changes having been made to the portion of the array, based on:
    (i) the first CRC value for the array before the changes are made to the portion of the array,
    (ii) the second CRC value for the portion of the array before the changes are made to the portion of the array, and
    (iii) the third CRC value for the portion of the array with the changes having been made to the portion of the array
storing, in the non-volatile storage, the fourth CRC value that was generated based on the first CRC value, the second CRC value, and the third CRC value;
receiving a request in the computing device to carry over to the portion of the array in the non-volatile storage the changes indicated by the information stored in the random access memory;
detecting, by the computing device, a power interruption;
in response to detecting the power interruption:
  computing a fifth CRC value based on the portion of the array in the non-volatile storage; and
  comparing the fourth CRC value that was generated based on the first CRC value, the second CRC value, and the third CRC value to the fifth CRC value; and
determining, based on determining that the fourth CRC value does not match the fifth CRC value, that data in the array in the non-volatile storage is likely corrupted.

7. The method of claim 6 further including providing an alert to indicate that the data in the array is likely corrupted.

8. The method of claim 7 wherein providing an alert includes providing a message in the computing device indicating the presence of likely corrupted data in the array in the non-volatile storage.

9. The method of claim 6 including repeatedly calling a function to write data buffered in the random access volatile memory to the non-volatile storage so as to synchronize the non-volatile storage with the volatile memory.

10. A computing device comprising:
  a non-transitory machine-readable medium storing instructions;
  a processor operable to execute the instructions;
  non-volatile storage storing an array; and
  volatile memory,
  wherein the processor is configured to execute the following operations based on the instructions:
    store, in the volatile memory of a computing device, the array that is stored in the non-volatile storage;
    store, in the volatile memory, information indicative of changes to be made to a portion of the array;
    compute a first cyclic redundancy check (CRC) value for the array before the changes are made to the portion of the array;
    compute a second CRC value for the portion of the array before the changes are made to the portion of the array;
    in response to storing, in the volatile memory, the information indicative of the changes to be made to the portion of the array:
      compute a third CRC value for the portion of the array with the changes having been made to the portion of the array;
      compute a fourth CRC value for the array with the changes having been made to the portion of the array, based on:
        (i) the first CRC value for the array before the changes are made to the portion of the array,
        (ii) the second CRC value for the portion of the array before the changes are made to the portion of the array, and
        (iii) the third CRC value for the portion of the array with the changes having been made to the portion of the array,
    carry over to the portion of the array in the non-volatile storage the changes indicated by the information stored in the volatile memory;
    store, in the non-volatile storage, the fourth CRC value that was generated based on the first CRC value, the second CRC value, and the third CRC value;
    detect, by the computing device, a power interruption;
    in response to detecting the power interruption:
      compute a fifth CRC value based on the portion of the array in the non-volatile storage; and
      compare the fourth CRC value that was generated based on the first CRC value, the second CRC value, and the third CRC value to the fifth CRC value; and
    based on comparing the fourth CRC value to the fifth CRC value, determine that the array in the non-volatile storage is valid or likely corrupted.

11. The computing device of claim 10 wherein the volatile memory is composed of random access memory.

12. The computing device of claim 10 wherein the non-volatile storage is composed of disk storage.

13. The computing device of claim 10 wherein the non-volatile storage is composed of flash memory.

14. The computing device of claim 10 wherein the processor computes the fourth CRC value and stores the fourth CRC value in the non-volatile storage in response to user request.

15. The computing device of claim 10 wherein the operation by the processor of storing information indicative of changes to be made to the portion of the array in volatile memory includes making changes to a bitmap in the volatile memory, but not changing the array in non-volatile storage.

16. The computing device of claim 10 wherein the bitmap represents portions of an underlying file of the array in the non-volatile storage that are to be modified.

17. The computing device of claim 10 wherein the processor is operable to cause a user-recognizable alert to be provided to indicate that the data in the array is likely corrupted.

18. The method of claim 1, comprising:
  storing, in the volatile memory of the computing device, (i) the first CRC value for the array before the changes are made to the portion of the array, (ii) the second CRC value for the portion of the array before the changes are made to the portion of the array, and (iii) the third CRC value for the portion of the array with the changes having been made to the portion of the array.

* * * * *